US012416511B2

(12) United States Patent
Zhang et al.

(10) Patent No.: US 12,416,511 B2
(45) Date of Patent: Sep. 16, 2025

(54) MAP USING METHOD, ROBOT AND MEDIUM

(71) Applicant: Keenon Robotics Co., Ltd., Shanghai (CN)

(72) Inventors: Fei Zhang, Shanghai (CN); Yonghui Wan, Shanghai (CN); Tong Li, Shanghai (CN)

(73) Assignee: Keenon Robotics Co., Ltd., Shanghai (CN)

( * ) Notice: Subject to any disclaimer, the term of this patent is extended or adjusted under 35 U.S.C. 154(b) by 482 days.

(21) Appl. No.: 17/951,503

(22) Filed: Sep. 23, 2022

(65) Prior Publication Data

US 2023/0095552 A1 Mar. 30, 2023

(30) Foreign Application Priority Data

Sep. 28, 2021 (CN) .......................... 202111144400.6

(51) Int. Cl.
*G01C 21/00* (2006.01)
*G01S 13/86* (2006.01)
*G01S 13/89* (2006.01)

(52) U.S. Cl.
CPC ..... *G01C 21/3859* (2020.08); *G01C 21/3837* (2020.08); *G01S 13/865* (2013.01); *G01S 13/89* (2013.01)

(58) Field of Classification Search
CPC ............ G01C 21/3859; G01C 21/3837; G01C 21/206; G01S 13/865; G01S 13/89; G01S 17/89; G01S 17/42; G01S 17/66; G01S 7/4817; G01S 7/4808; G01B 11/002; G01B 11/24; G06F 18/25; G06F 18/21
USPC ................. 250/205; 345/419; 356/5.01, 614; 382/154, 181; 702/159, 167, 188, 155, 702/150, 152, 57, 183
See application file for complete search history.

(56) References Cited

U.S. PATENT DOCUMENTS

2014/0118339 A1* 5/2014 Davies .................. G06T 19/006 345/419

FOREIGN PATENT DOCUMENTS

| | | | | |
|---|---|---|---|---|
| CN | 111507166 A * | 8/2020 | | G01S 13/867 |
| CN | 114440922 A * | 5/2022 | | |
| CN | 118097162 A * | 5/2024 | | |
| WO | WO-2021212875 A1 * | 10/2021 | | G01S 17/89 |

* cited by examiner

*Primary Examiner* — Jeffrey P Aiello
(74) *Attorney, Agent, or Firm* — Westbridge IP LLC

(57) ABSTRACT

Disclosed are a map construction method, a robot, and a storage medium. A center of a lidar of a mapping robot is taken as a starting point, and a radar probe is arranged according to a preset distance; the radar probe is configured to determine a reference point cloud; the lidar of the mapping robot is controlled to scan the target environment to obtain scanning data; the target environment includes a wall and an obstacle; according to the scanning data, a virtual wall corresponding to the wall is determined; according to the scanning data, the reference point cloud determined by the radar probe is fitted to update the virtual wall to obtain an updated virtual wall; a target map including the updated virtual wall is generated.

20 Claims, 5 Drawing Sheets

MAP USING METHOD, ROBOT AND MEDIUM

CROSS-REFERENCE TO RELATED APPLICATIONS

The present application claims priority to Chinese Patent Application No. 202111144400.6, filed on Sep. 28, 2021, all contents of which are incorporated herein in its entirety by reference.

TECHNICAL FIELD

The embodiments of the present application relate to the field of robots, and in particular, to a map construction method, a robot, and a storage medium.

BACKGROUND

With the development of science and technology and further liberation of productivity, in view of the requirements of Made in China 2025 and Industry 4.0 for the automation industry, robot-related technologies have become one key area of future development in China. The environmental mapping technology of mobile robots is particularly important.

For the mapping process of a mobile robot, a current main approach is to directly scan the environment where the mobile robot is located and determine a two-dimensional environment map. However, this method of constructing maps based on direct scanning of the environment has many deficiencies in the construction of the environment and low accuracy, and there are certain safety risks when the robot is controlled based on the mapping results.

SUMMARY

The present application provides a map construction, a robot and a medium, so as to improve the comprehensiveness of map construction in the case of obstacle occlusion, thereby improving the driving safety of the robot.

In a first aspect, an embodiment of the present application provides a map construction method, including: arranging a radar probe according to a preset distance by taking a center of a lidar of a mapping robot as a starting point, where the radar probe is configured to determine a reference point cloud; controlling the lidar of the mapping robot to scan a target environment to obtain scanning data, the target environment includes a wall; determining a virtual wall corresponding to the wall according to the scanning data; fitting the reference point cloud determined by the radar probe according to the scanning data to update the virtual wall to obtain an updated virtual wall; and generating a target map including the updated virtual wall.

In a second aspect, an embodiment of the present application also provides a map using method, including: obtaining a target map including a virtual wall, where the target map is generated by the map construction method according to any one embodiment of the present application; and performing a move of a current robot according to the target map.

In a third aspect, an embodiment of the present application also provides a map construction device, including: a marking module, configured to arrange a radar probe according to a preset distance by taking a center of a lidar of a mapping robot as a starting point, where the radar probe is configured to determine a reference point cloud; scanning data acquisition module, configured to control the lidar of the mapping robot to scan a target environment to obtain scanning data, the target environment including a wall; a defective area determination module, configured to determine a virtual wall corresponding to the wall according to the scanning data; a defective area updating module, configured to fit the reference point cloud determined by the radar probe according to the scanning data to update the virtual wall to obtain an updated virtual wall; and a virtual wall generation module, configured to generate a target map including the updated virtual wall.

In a fourth aspect, an embodiment of the present application also provides a map using device, including: a map acquisition module, configured to acquire a target map including a virtual wall, where the target map is generated by the map construction method according to any one of embodiments of the present application; and a control module, configured to perform a move of a current robot according to the target map.

In a fifth aspect, an embodiment of the present application also provides a robot, including: one or more processors; a memory for storing one or more programs; when the one or more programs are executed by the one or more processors, the one or more processors realize the map construction method according to any one of embodiments in the first aspect, and/or the map using method according to the embodiment in the second aspect.

In a sixth aspect, an embodiment of the present application further provides a computer-readable storage medium having a computer program stored thereon, and when the program is executed by a processor, the map construction method according to any one of embodiments in the first aspect, and/or the map using method according to the embodiment in the second aspect is realized.

The technical solutions of the embodiments of the present application ensure the integrity of the robot mapping by determining the defective area and updating the virtual wall according to the reference point cloud, reduce the influence of the obstacle on the robot mapping, and solve the problem that the wall blocked by the obstacle cannot be mapped, thereby completing mapping of all walls in the environment. At the same time, because the wall is completely mapped, even if the obstacle in the environment leaves the original position, there is no need to rescan the environment to map the wall to determine the position of the wall, which indirectly improves the work efficiency and flexibility of the robot.

DETAILED DESCRIPTIONS OF THE EMBODIMENTS

The present application will be further described in detail below with reference to the accompanying drawings and examples. It should be understood that the specific examples described herein are only used to explain the present application, but not to limit the present application. In addition, it should be noted that, for the convenience of description, the drawings only show some but not all the structures related to the present application.

Figure 1A:
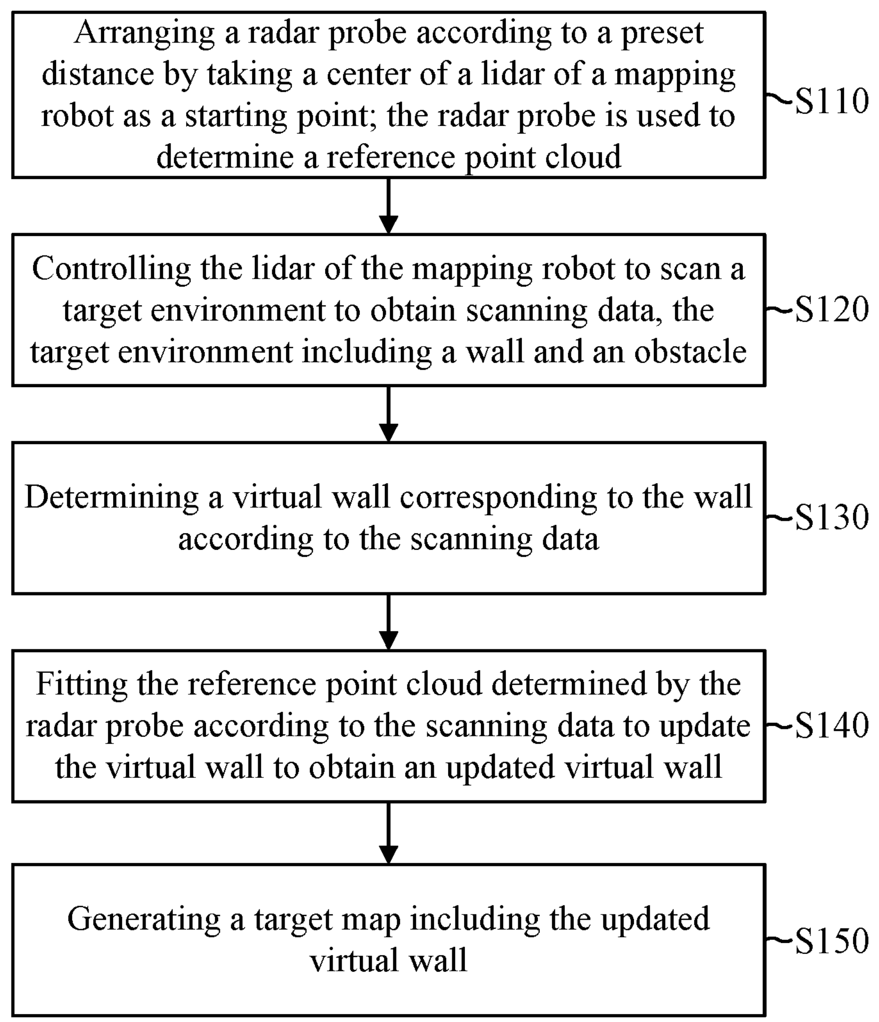
FIG. 1A is a flowchart of a map construction method provided in an embodiment of the present application.

FIG. 1A is a flowchart of a map construction method provided in an embodiment of the present application. The embodiments of the present application are applicable to the case of constructing a map of a wall blocked by an obstacle, and the method can be executed by a map construction device, which can be implemented by software and/or hardware, and is specifically configured in a mapping robot.

Referring to the map construction method shown in FIG. 1A and applied to the mapping robot, the map construction method specifically includes the following steps:

S110: arranging a radar probe according to a preset distance by taking a center of a lidar of a mapping robot as a starting point; the radar probe is used to determine a reference point cloud.

The mapping robot refers to a machine device with map construction capability, which may include but is not limited to a mobile robot, such as a service robot, a logistics robot, and the like. Radar probe is an improved scanning tool based on radar technology and is provided in the above mapping robot. Radar probe's function is to mark reference points used for auxiliary mapping during a mapping process to obtain the point cloud data of the reference points. The preset distance is a preset distance from a center of a lidar of the mapping robot to the wall, which can be understood as the distance from a start point to an end point of the radar probe. The preset distance of radar probe can be arranged manually, or automatically determined by the mapping robot according to an actual scene. For example, the preset distance is arranged to be 1 meter or 3 meters.

S120: controlling the lidar of the mapping robot to scan a target environment to obtain scanning data, the target environment including a wall and an obstacle.

The target environment is an actual scene where the mapping robot scans and builds a map. The actual scene can include but is not limited to walls and various obstacles. The scene data saved after scanning the actual scene is scanning data.

Specifically, the lidar of the mapping robot is used to scan the walls and obstacles within the preset distance. The scanning process of lidar takes the center of the lidar as the center to scan a fan-shaped area facing the wall and the obstacle, and store the information of the wall and the obstacle in a preset recording manner. For example, the point cloud data of the scanned wall and the obstacle is stored for use as scanning data.

Figure 1B:
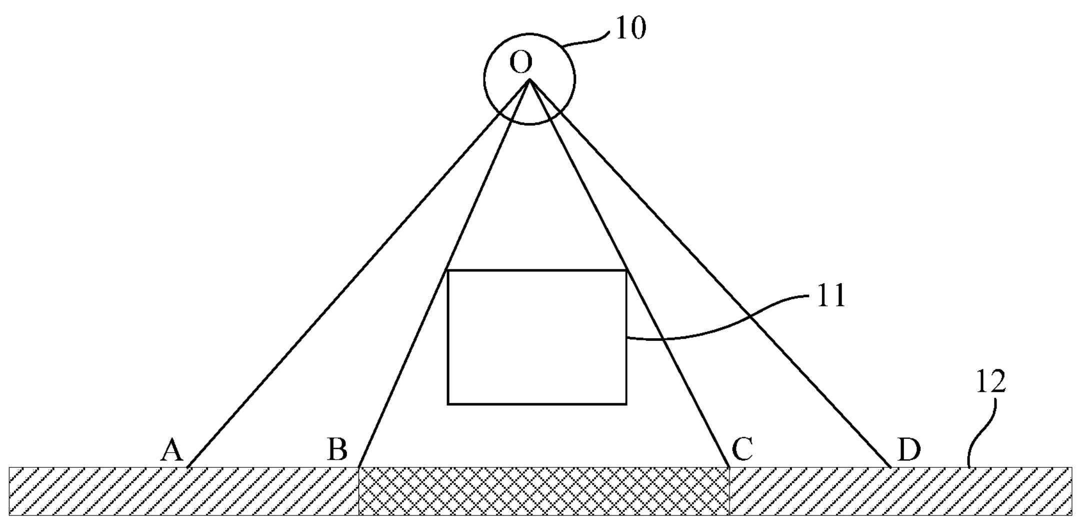
FIG. 1B is a two-dimensional top view of a radar probe scanning process provided in an embodiment of the present application.

In the scanning process of the radar probe as shown in FIG. 1B, the mapping robot 10 faces the obstacle 11 and the wall 12, and a lidar transmitter is installed at the O point of the robot to scan the obstacle and the wall. Since the line of sight of the radar probe is blocked, the radar probe cannot scan the BC segment wall, therefore, only the scanning data about AB segment wall and CD segment wall is obtained in this scanning process.

S130: determining a virtual wall corresponding to the wall according to the scanning data.

The virtual wall refers to the wall information in the map information created by the mapping robot according to the scanning data obtained in the preceding steps. In the actual scene, as shown in FIG. 1B, because the obstacle blocks a part of the wall, the lidar cannot bypass the obstacle to scan the part of the wall that is blocked by the obstacle, so the wall information recorded by the mapping robot during the scanning process contains the defective area.

It is worth noting that the position and direction of the robot can be changed so that the radar probe can scan the target environment from different angles, thereby reducing the influence of the viewing angle and line of sight on the acquisition of scanning data.

S140: fitting the reference point cloud determined by the radar probe according to the scanning data to update the virtual wall to obtain an updated virtual wall.

The reference point cloud is the point cloud data of the reference point defined to complete the defective area. The reference point cloud can be determined by manually marking reference point cloud, or can be automatically marked by the mapping robot according to the actual situation, which is not limited in the examples of the present application. It is worth noting that, in order to complete the defective area to update the virtual wall, the wall point cloud data in scanning data may be directly called, the wall point cloud data is fitted to obtain the point cloud data of the wall containing the defective area, and information about the original virtual wall is updated.

Specifically, according to scanning data and reference point cloud, the wall information containing the defective area, and the reference point cloud of the defective area are fitted to obtain new wall information, and the new wall information is saved to the mapping robot for updating virtual wall.

S150: generating a target map including the updated virtual wall.

The target map is the two-dimensional map of the target environment constructed after scanning. In the previous steps, the wall information containing the defective area is obtained, and the wall information is updated according to the reference point cloud. The mapping robot can construct an updated complete virtual wall according to the wall information, thereby generating a two-dimensional map of the target environment.

In a specific example, the mapping robot with a preset radar probe is arranged in the target environment, for example, in a house; the mapping robot faces the wall to scan, the scanned wall point cloud and obstacle point cloud may be recorded at the same time, and the mapping robot can analyze these point cloud data to obtain the defective area information of the virtual wall blocked by the obstacle; the mapping robot is controlled to directly fit the obtained wall point cloud to fill the defective area of the virtual wall and obtain a complete virtual wall; or, the mapping robot is controlled to mark the reference point cloud for the defective area of the virtual wall through the radar probe according to the preset conditions, and the defective area of the virtual wall is filled to obtain a complete virtual wall. The fitting method is performed according to an artificial preset rule, or is performed by a preset two-dimensional fitting algorithm, such as a least squares method, a gradient descent method, and the like. Finally, the fitted wall point cloud data is stored as the wall information in the map information.

The technical solution of the example of the present application, by determining the defective area and updating the virtual wall according to the reference point cloud, solves the problem that the wall blocked by the obstacle cannot be mapped, and realizes the complete mapping of all the walls in the environment. At the same time, since the wall is completely mapped, even if the obstacle in the environment leaves the original position, there is no need to rescan the environment to map the wall position, which indirectly improves the work efficiency and flexibility of the mapping robot.

Figure 2A:
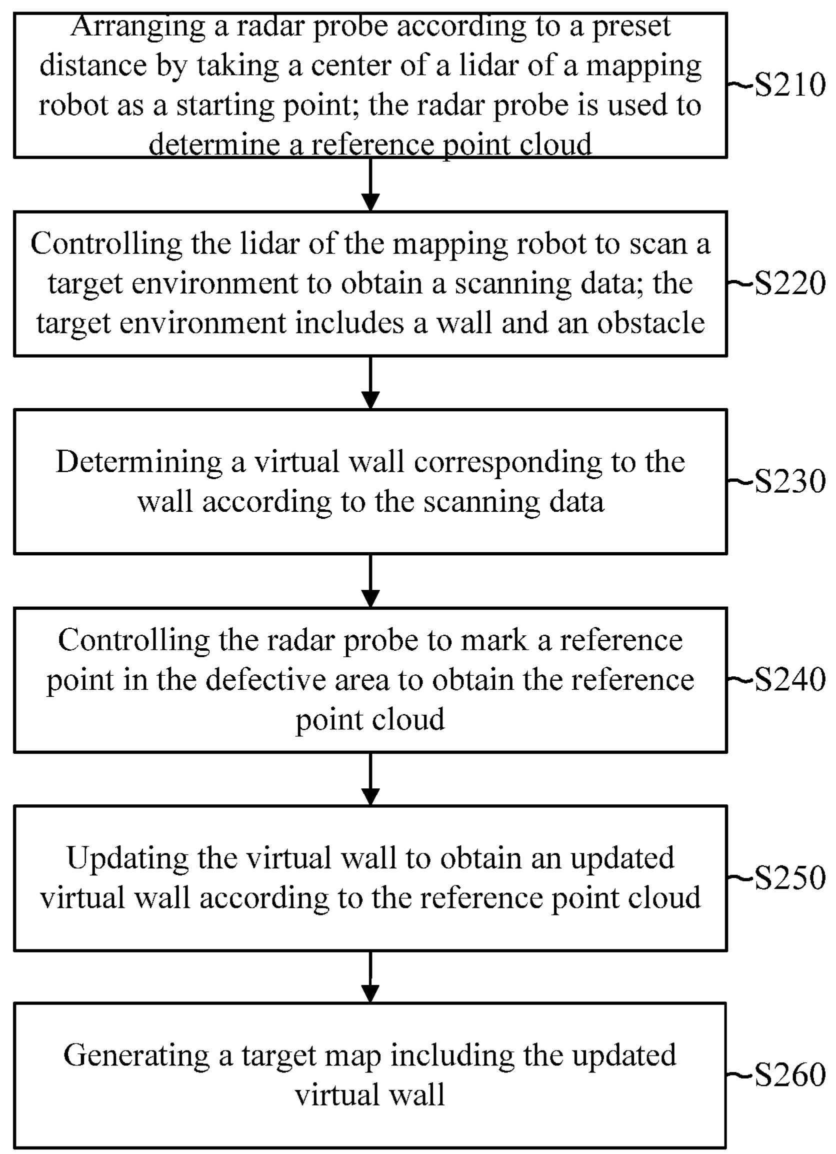
FIG. 2A is a flowchart of a map construction method provided by an embodiment of the present application.

FIG. 2A is a flowchart of a map construction method provided in an embodiment of the present application. The embodiment of the present application optimizes the update operation of the virtual wall on the basis of the technical solutions of the foregoing embodiments, so as to obtain the data of the reference point cloud by using the radar probe to mark a reference point.

Referring to a map construction method shown in FIG. 2A, the map construction method specifically includes the following steps:

S210: arranging a radar probe according to a preset distance by taking a center of a lidar of a mapping robot as a starting point; the radar probe is used to determine a reference point cloud.

S220: controlling the lidar of the mapping robot to scan a target environment to obtain scanning data; the target environment includes a wall and an obstacle.

S230: determining a virtual wall corresponding to the wall according to the scanning data.

S240: controlling the radar probe to mark a reference point in the defective area to obtain the reference point cloud.

The radar probe is used to mark the defective area of the virtual wall, and the reference point information of the mark is stored as point cloud data. Optionally, the end point of the radar probe is used to mark the reference point in the defective area, and the end point of the radar probe refers to the top of the radar probe. The method of marking can be artificially marking, or a mapping robot can mark the reference point according to the actual scene.

S250: updating the virtual wall to obtain an updated virtual wall according to the reference point cloud.

According to the point cloud data of the reference point obtained in the previous steps, the reference point cloud is fitted to complete the defective area of the virtual wall, and then the wall information of the virtual wall is updated.

S260: generating a target map including the updated virtual wall.

In an optional example, the controlling the radar probe to mark the reference point in the defective area to obtain the reference point cloud may include: the end point of the radar probe is overlapped with point cloud of an edge of the virtual wall, and the scanning length of the radar probe is determined; according to the scanning length, the reference point is marked along the extension direction of the virtual wall in the defective area to obtain the reference point cloud.

The mapping robot is controlled to make the end point of the radar probe overlap with the point cloud data of the edge of the virtual wall. The mapping robot obtains the distance between the current lidar and the defective area. According to this distance, the mapping robot follows the existing virtual wall point cloud data (that is, the wall information that is not blocked by the obstacle and is directly scanned and recorded by the mapping robot) marks the reference point in the extension direction of the defective area, and stores the obtained reference point cloud.

In an optional embodiment, when using the radar probe, the user can also move the mapping robot to the position where the wall information is collected, and adjust the position and angle of the robot so that the probe captures the virtual point cloud at a preset distance from the robot. The angle of the mapping robot radar probe can be adjusted according to the existing scanning data, so that the end point of the radar probe is located on the extension line of the virtual wall in the existing scanning data. At this time, the point cloud at the end point of the radar probe is a valid reference point. The marking operation is repeated several times to perform the virtual wall fitting step, and finally obtain a complete and continuous virtual wall. The technical solution of this embodiment can be adapted to more complex scenes. Facing some movable obstacles or irregular walls in the environment, the marking of the reference point cloud can be adjusted adaptively, which improves the robot's mapping accuracy and efficiency.

Figure 2B:
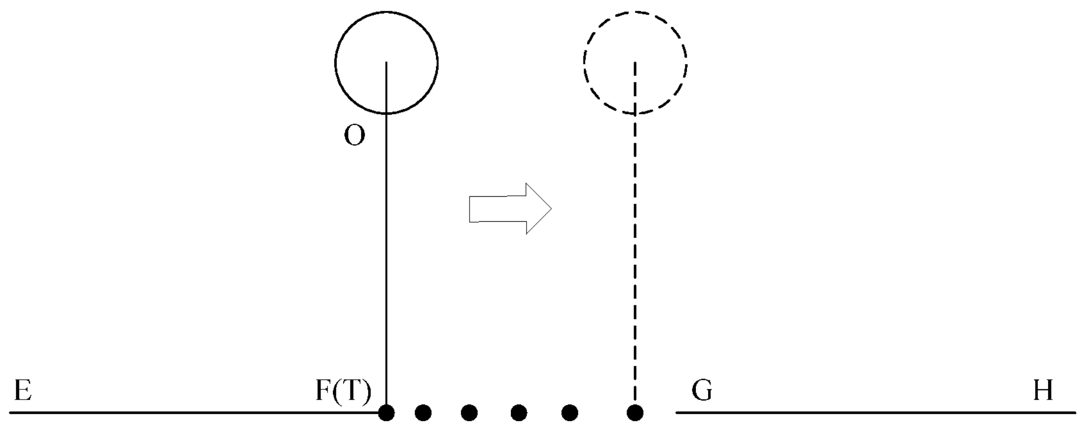
FIG. 2B is a two-dimensional top view of a radar probe scanning process provided in an embodiment of the application.

In a specific example, as shown in FIG. 2B, the situation shown in the figure is that the information of the virtual wall, EH segment, has been determined, including the wall information of the EF segment and the GH segment and the defective area of the FG segment. The end point T of the radar probe OT of the mapping robot overlaps with the end point F of the defective area FG, and the OT length is determined, the mapping robot is moved in the direction of the defective area FG according to the OT length, and the reference point is marked (that is, the black solid point in the figure). A complete virtual wall is fitted from the point cloud data of these reference points.

The above embodiment marks the reference point of the defective area according to the length of the radar probe. The method of marking the reference point based on the distance by using characteristics of the radar probe is simple and efficient, which simplifies the process of determining the wall information of the defective area, and ensures the accuracy of the reference point and indirectly improves the efficiency and quality of determining the virtual wall, and provides a basis for fitting the complete virtual wall.

In the technical solution of the example of the present application, the reference point of the defective area is marked and then the virtual wall is updated. The radar probe is used to mark the reference point of the defective area, which makes the reference point cloud more accurate and improves the mapping efficiency of the virtual wall and the mapping robot's ability to map on blocked walls.

Figure 3A:
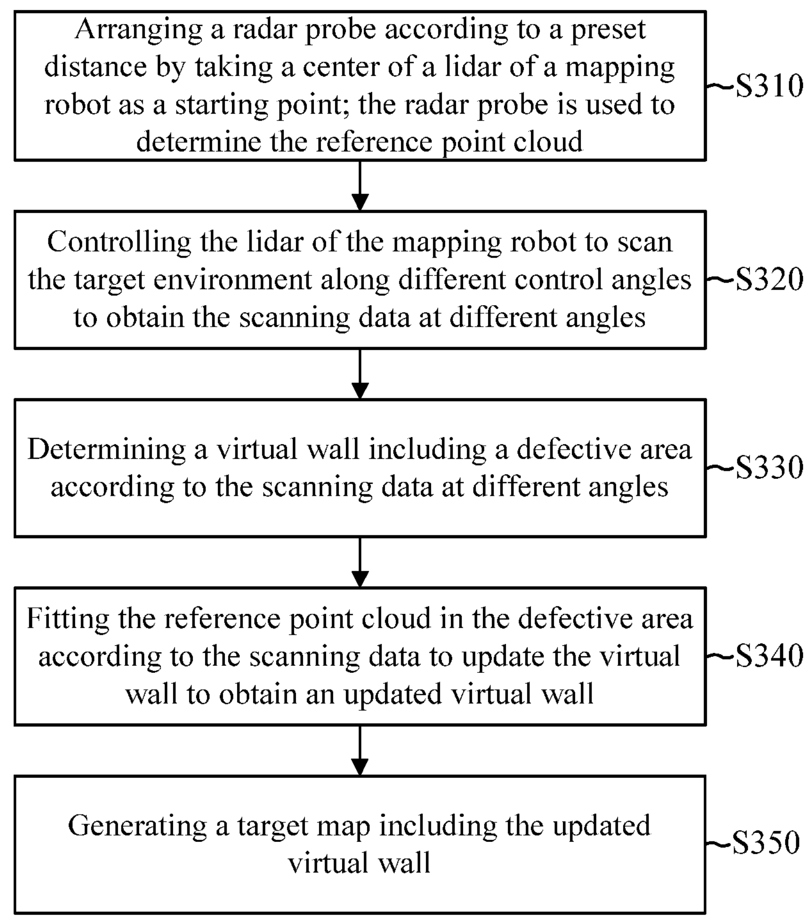
FIG. 3A is a flowchart of a map construction method provided by an embodiment of the present application.

FIG. 3A is a flowchart of a map construction method provided in an embodiment of the present application. Based on the technical solutions of the foregoing examples, the examples of the present application optimize the operations of acquiring scanning data and determines the defective area, so as to acquire scanning data from different angles and update the defective area.

With reference to a map construction method shown in FIG. 3A, the map construction method specifically includes the following steps:

S310: arranging a radar probe according to a preset distance by taking a center of a lidar of a mapping robot as a starting point; the radar probe is used to determine the reference point cloud.

S320: controlling the lidar of the mapping robot to scan the target environment along different control angles to obtain the scanning data at different angles.

Specifically, if the mapping robot scans the target environment from a single angle at a single location, only the scanning data corresponding to the current angle is obtained through the perspective relationship. Due to the influence of the viewing angle and line of sight, there are many incomplete parts of the virtual wall in the scanning data. Therefore, by controlling the mapping robot to change the position and angle, the radar probe scans the same target environment again from a different angle, that is, to obtain different scanning data from the previous one.

Optionally, the position and angle of the mapping robot is changed at least twice to scan the same target environment, and the specific number of changes is arranged manually, or can be automatically determined by the mapping robot according to the actual situation.

S330: determining a virtual wall including a defective area according to the scanning data at different angles.

Based on the above scanning data of at least two mapping at different positions and scanning angles, these data are organized to generate a virtual wall containing a defective area. Optionally, the point cloud data of the wall scanned from different angles is integrated into the point cloud data of the virtual wall; and every time point cloud data is scanned, the scanned point cloud data is superimposed on that of the previous scanning.

S340: fitting the reference point cloud in the defective area according to the scanning data to update the virtual wall to obtain an updated virtual wall.

S350: generating a target map including the updated virtual wall.

In an optional embodiment, the controlling the lidar of the mapping robot to scan the target environment from different control angles to obtain scanning data at different angles includes: determining the current control angle along the reducing direction of the defective area determined by the previous control angle; controlling the lidar of the mapping robot to scan the target environment from the current control angle to obtain scanning data at the current control angle.

Specifically, after the defective area of the virtual wall is determined last time, the mapping robot is moved in the direction that can reduce the defective area, and the current scanning angle is found to scan the same target environment to obtain the scanned point cloud data of the virtual wall.

The above-mentioned example realizes the reduction and update of the defective area of the virtual wall by controlling the mapping robot to move in the direction that can reduce the defective area to change the scanning angle, which is equivalent to expanding the point cloud data of the virtual wall blocked by the obstacle. The more the scanning angle changes, the more integrity point cloud data of the wall is. By changing the angle to scan, the defective area becomes smaller and smaller, and the less reference point cloud needs to be marked correspondingly, and the more detailed the mapping of the wall is. This method improves the accuracy of the mapping robot for wall mapping and improves the efficiency of mapping robot mapping.

In an optional example, the determining the virtual wall including the defective area according to the scanning data at different angles may include: taking the virtual wall including the defective area determined by the previous control angle as current virtual wall; superimposing the scanning data of the current control angle on the current virtual wall to update the defective area in the current virtual wall; a reference virtual wall corresponding to the previous control angle of the first control angle is empty.

Specifically, if the current scan is the first scan of the target environment, that is, when the target environment is scanned from the first control angle, there is no the point cloud data of any walls in a memory of the robot, server or cloud server used to store data, which means there is no virtual wall, and thus it is necessary to scan and load the point cloud data of the virtual wall containing the defective area for the first time.

In each subsequent scanning, due to the change of the scanning angle and the perspective relationship, the point cloud data of the virtual wall containing the defective area obtained by each scanning are different. Therefore, on the basis of the point cloud data scanned before, the point cloud data obtained from each scanning are superimposed in turn, and the union of the point cloud data from multiple scans is obtained to update the defective area in the virtual wall.

The above-mentioned embodiment simply and efficiently integrates the point cloud data obtained by scanning multiple times at different angles by superimposing the scanning data multiple times to update the defective area to obtain finer point cloud data of the virtual wall, which improves the performance of the virtual wall. The accuracy of the determination of the virtual wall, while making the defective area smaller and smaller with the stacking of multiple scanning data, reduces the number of reference point clouds determined, and makes the fitting of the virtual wall more accurate.

Figure 3B:
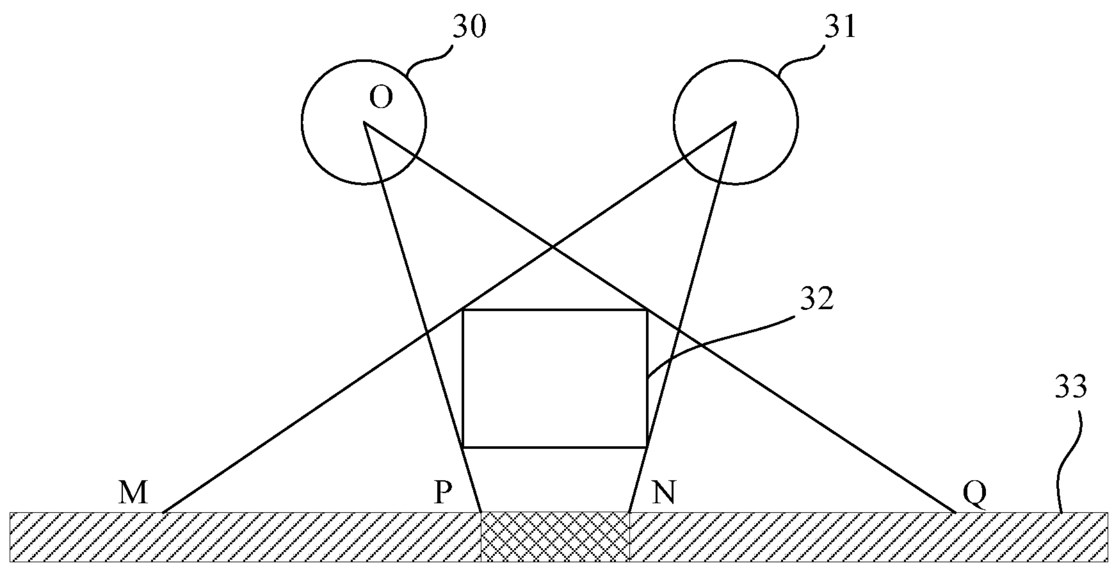
FIG. 3B is a two-dimensional top view of a radar probe scanning process provided in an embodiment of the present application.

In a specific embodiment, in the radar probe scanning process shown in FIG. 3B, the current mapping robot is at position 30, and the radar probe is used to scan the obstacle 32 and the wall 33. Due to the obstructed viewing angle and line of sight, the mapping robot cannot scan the wall information of the PQ segment at position 30; in the same way, the current mapping robot is moved to position 31 and the scanning angle of the radar probe is adjusted, but the wall information of the MN segment cannot be scanned. However, due to the intersection of the wall information of the PQ segment and the MN segment, the mapping robot can scan the wall information of the MP segment and the NQ segment through the radar probe in the two scanning processes, so the wall information obtained by the two scans is integrated and the defective area is reduced to update the virtual wall.

In the technical solution of the example of the present application, by controlling the radar probe to scan the target environment at different angles, more precise point cloud data of the virtual wall is obtained, and the virtual wall is updated while reducing the defective area, so that the determination of the virtual wall is more accurate and effective. This method improves the accuracy of virtual wall determination, reduces the influence of large defective area on virtual wall determination, and improves the efficiency of mapping robot mapping.

Figure 4:
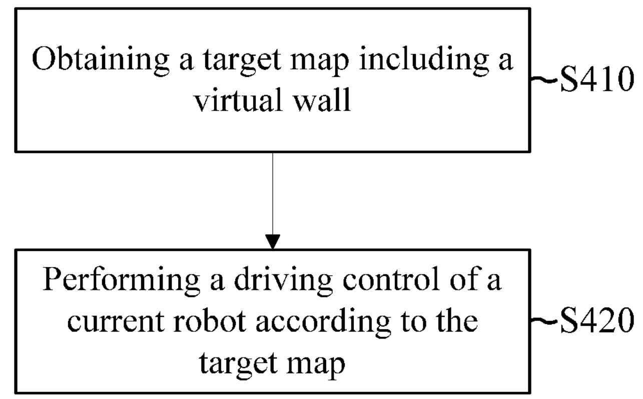
FIG. 4 is a flowchart of a map using method provided by an embodiment of the present application.

FIG. 4 is a flowchart of a map using method provided in an embodiment of the present application. The embodiment of the present application is applied to the case of using a map constructed by a robot, and the method is executed by a map using device, which can be implemented by software and/or hardware, and is specifically configured in the current robot. The current robot is understood as the robot in the current driving process, which is the same as or different from the mapping robot.

Referring to the map using method shown in FIG. 4 applied to the current robot, the map using method specifically includes the following steps:

S410: obtaining a target map including a virtual wall.

The target map is generated using any one of the map construction methods provided by the above embodiments of the present application.

S420: performing a move of a current robot according to the target map.

Specifically, the current robot can call the generated target map including the virtual wall, and perform move in the actual scene according to the target map. The move includes but is not limited to, an obstacle avoidance control and the like.

The technical solution of the embodiment of the present application, by acquiring the target map and controlling the movement of the mapping robot accordingly, prevents the robot from colliding with the wall and/or the obstacle when moving in the environment, improves the work efficiency of the mapping robot, the flexibility of the robot's work and the driving safety of the current robot.

Figure 5:
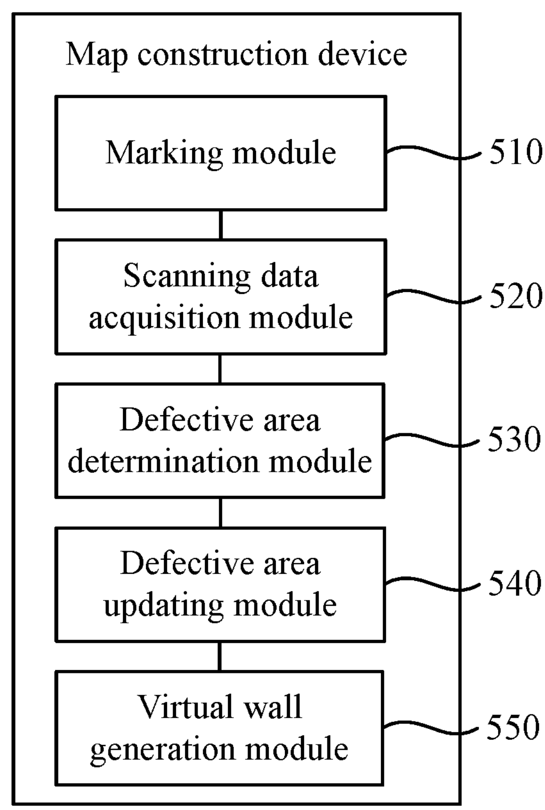
FIG. 5 is a structural diagram of a map construction device provided in an embodiment of the present application.

FIG. 5 is a structural diagram of a map construction device provided in an embodiment of the present application. The embodiment of the present application is applied to the construction of a wall map blocked by an obstacle. The device can be implemented by software and/or hardware and configured in the mapping robot. As shown in FIG. 5, the device may include:

A marking module 510, configured to arrange a radar probe according to a preset distance with a center of a lidar of a mapping robot as a starting point; the radar probe is used to determine a reference point cloud;

A scanning data acquisition module 520, configured to control the lidar of the mapping robot to scan the target environment to obtain scanning data; the target environment includes a wall and an obstacle;

A defective area determination module 530, configured to determine the virtual wall corresponding to the wall according to the scanning data;

A defective area updating module 540, configured to fit the reference point cloud determined by the radar probe to update the virtual wall according to the scanning data to obtain an updated virtual wall;

A virtual wall generation module 550, configured for the virtual wall to generate a target map including the updated virtual wall.

The technical solutions of the embodiments of the present application ensure the integrity of the robot mapping by determining the defective area and updating the virtual wall according to the reference point cloud, reduce the influence of the obstacle on the robot mapping, and solve the problem that the wall blocked by an obstacle cannot be mapped and thereby achieving the effect of complete mapping of all walls in the environment. At the same time, since the wall is completely mapped, even if the obstacle in the environment leaves the original position, there is no need to rescan the environment to map the wall to determine the position of the wall, which indirectly improves the work efficiency and flexibility of the robot.

In an optional example, the defective area updating module 540 includes:

a reference point cloud acquisition unit, configured to control the radar probe to mark the reference point in the defective area to obtain the reference point cloud;

a virtual wall updating unit, configured to update the virtual wall according to the reference point cloud.

In an optional embodiment, the reference point cloud obtaining unit includes:

a scanning length determination subunit, configured to overlap point cloud of an edge of described defective area with an end point of the radar probe and determine the scanning length of the radar probe;

a reference point cloud acquiring subunit, configured to mark, according to the scanning length, a reference point along an extending direction of the virtual wall in the defective area to obtain the reference point cloud.

In an optional example, the scanning data acquisition module 520 includes:

a scanning data acquisition unit, configured to control the lidar of the mapping robot to scan the target environment along different control angles to obtain the scanning data at different angles;

The defective area determination module 530 includes:

a defective area determination unit, configured to determine the virtual wall including the defective area according to the scanning data at different angles.

In an optional example, the scanning data acquisition unit includes:

a control angle determination subunit, configured to determine the current control angle along the reduction direction of the defective area determined by a previous control angle;

a scanning data determination subunit, configured to control the lidar of the mapping robot to scan the target environment along the current control angle to obtain scanning data of the current control angle.

In an optional embodiment, the defective area determination unit includes:

a virtual wall determination subunit, configured to use the virtual wall including the defective area determined by the previous control angle as the current virtual wall;

a defective area update subunit, configured to superimpose the scanning data of the control angle this time on the virtual wall to update a defective area in the virtual wall.

The reference virtual wall corresponding to a previous control angle of a first control angle is empty.

The map construction device provided by the example of the present application can execute the map construction method provided by any example of the present application, and has functional modules and beneficial effects corresponding to executing each map construction method.

Figure 6:
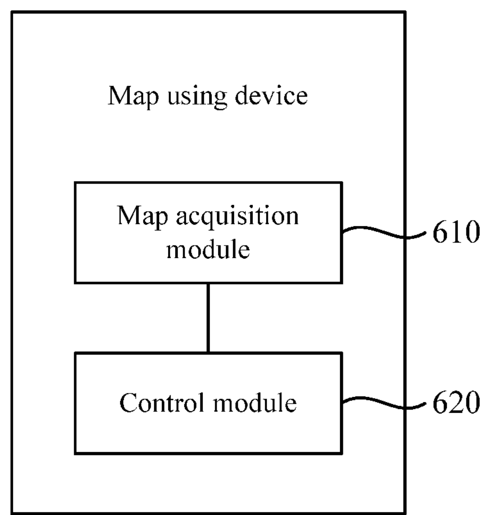
FIG. 6 is a structural diagram of a map using device provided by an embodiment of the present application.

FIG. 6 is a structural diagram of a map using device provided in an embodiment of the present application. The embodiment of the present application is applied to a map constructed by using a robot. The device is executed by a software and/or hardware, and configured in the current robot. The current robot is the same as or different from the above mapping robot.

As shown in FIG. 6, the device includes:

a map acquisition module 610, configured to acquire a target map including a virtual wall; the target map is generated by using the map construction method according to any one of the examples of the present application;

a control module 620, configured to perform a move of a current robot according to the target map.

The technical solution of the embodiment of the present application, by acquiring the target map and controlling the robot movement accordingly, prevents the robot from colliding with the wall and/or the obstacle when moving in the environment, improves the working efficiency of the robot, and the working flexibility of the robot.

The map construction device provided by the embodiment of the present application can execute the map using method provided by any example of the present application, and has functional modules and beneficial effects corresponding to executing each map using method.

Figure 7:
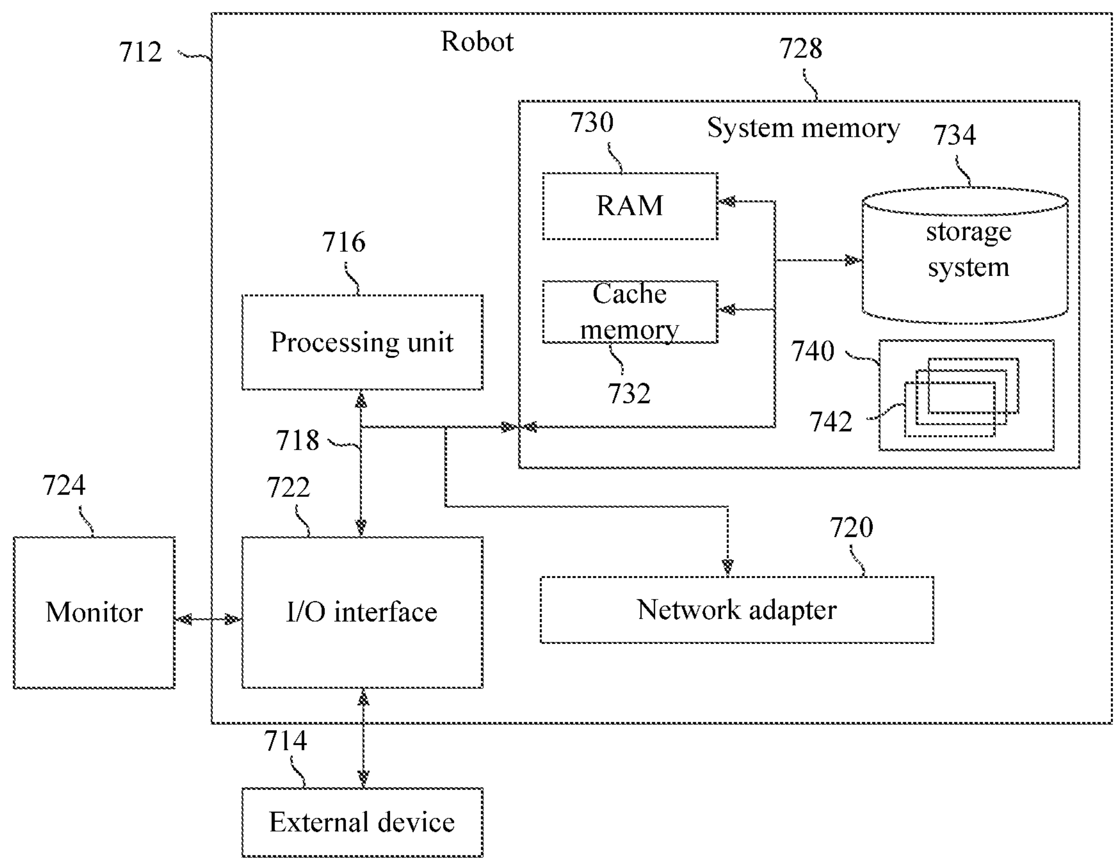
FIG. 7 is a structural diagram of a robot provided by an embodiment of the present application.

FIG. 7 is a structural diagram of a robot according to an embodiment of the present application. FIG. 7 shows a block diagram of an exemplary robot 712 suitable for implementing examples of the present application. The robot 712 shown in FIG. 7 is only an example, and should not impose any limitations on the functions and scope of use of the examples of the present application.

As shown in FIG. 7, the robot 712 takes the form of a general-purpose computing device. Components of robot 712 may include, but are not limited to, one or more processors or processing units 716, a system memory 728, and a bus 718 connecting various system components including system memory 728 and processing unit 716.

The bus 718 represents one or more of several types of bus structures, including a memory bus or memory controller, a peripheral bus, a graphics acceleration port, a processor, or a local bus using any of a variety of bus structures. By way of example, these architectures include, but are not limited to, Industry Standard Architecture (ISA) bus, Micro Channel Architecture (MAC) bus, Enhanced ISA bus, Video Electronics Standards Association (VESA) local bus, and Peripheral Component Interconnect (PCI) bus.

Robot 712 typically includes a variety of computer system readable mediums. These mediums can be any available mediums that can be accessed by the robot 712, including volatile and non-volatile medium, removable and non-removable medium.

System memory 728 includes a computer system readable medium in the form of volatile memory, such as Random Access Memory (RAM) 730 and/or cache memory 732. The robot 712 further includes other removable/non-removable, volatile/non-volatile computer system storage medium. For example, the storage system 734 may be used to read and write to non-removable, non-volatile magnetic medium (not shown in FIG. 7, commonly referred to as a "hard drive"). Although not shown in FIG. 7, a disk drive may be provided for reading and writing to removable non-volatile magnetic disks (e.g., "floppy disks"), as well as removable non-volatile optical disks (e.g., CD-ROM, DVD-ROM) or other optical medium) to read and write optical drives. In these cases, each drive may be connected to bus 718 through one or more data medium interfaces. The memory 728 may include at least one program product having a set (e.g., at least one) of program modules configured to perform the functions of various examples of the present application.

A program/utility 740 having a set (at least one) of program modules 742, which may be stored, for example, in memory 728. Such program modules 742 includes but not limited to, an operating system, one or more application programs, other program modules, and program data, each or some combination of these examples may include an implementation of a network environment. Program modules 742 generally perform the functions and/or methods of the examples described herein.

The robot 712 may also communicate with one or more external devices 714 (e.g., keyboards, pointing devices, monitors 724, etc.), with one or more devices that enable a user to interact with the robot 712, and/or with any device making the robot 712 communicate with one or more other computing devices (e.g., network cards, modems, etc.). Such communication may take place through input/output (I/O) interface 722. Also, the robot 712 may communicate with one or more networks (e.g., a local area network (LAN), a wide area network (WAN), and/or a public network such as the Internet) through a network adapter 720. As shown, network adapter 720 communicates with other modules of robot 712 via bus 718. It should be understood that, although not shown, other hardware and/or software modules may be used in combination with the robot 712, including but not limited to: microcode, device drivers, redundant processing units, external disk drive arrays, RAID systems, tape drives, and data Backup storage systems, etc.

The processing unit 716 executes various functional applications and data processing by running at least one of other programs among the multiple programs stored in the system memory 728, such as implementing the map construction method provided by any one of the examples of the present application, and/or, the map using method provided in any embodiment of the present application.

The eighth embodiment of the present application further provides a computer-readable storage medium on which a computer program (or referred to as a computer-executable instruction) is stored. The program is executed by the processor to execute a map construction method provided by embodiments of the present application: arranging a radar probe according to a preset distance by taking a center of a lidar of a mapping robot as a starting point, where the radar probe is configured to determine a reference point cloud; controlling the lidar of the mapping robot to scan a target environment to obtain scanning data, the target environment including a wall; determining a virtual wall corresponding to the wall according to the scanning data; fitting the reference point cloud determined by the radar probe according to the scanning data to update the virtual wall to obtain an updated virtual wall; and generating a target map including the updated virtual wall.

Embodiments of the present application further provide another computer-readable storage medium, on which a computer program (or referred to as a computer-executable instruction) is stored, and when the program is executed by a processor, it is used for executing a map using method: obtaining a target map including a virtual wall, where the target map is generated by using the map construction method described in the embodiment of the present application; performing a move of a current robot according to the target map.

The computer storage medium of the embodiments of the present application may adopt any combination of one or more computer-readable medium. The computer-readable medium may be a computer-readable signal medium or a computer-readable storage medium. The computer-readable storage medium can be, for example, but not limited to, an electrical, magnetic, optical, electromagnetic, infrared, or semiconductor system, apparatus or device, or any combination of the above. More specific examples (a non-exhaustive list) of computer-readable storage medium include: electrical connections with one or more wires, portable computer disks, hard disks, random access memory (RAM), read only memory (ROM), erasable programmable read only memory (EPROM or flash memory), optical fiber, portable compact disk read only memory (CD-ROM), optical storage devices, magnetic storage devices, or any suitable combination of the foregoing. In this document, a computer-readable storage medium can be any tangible medium that contains or stores a program that can be used by or in combination with an instruction execution system, apparatus, or device.

A computer-readable signal medium may include a propagated data signal in baseband or as part of a carrier wave, with computer-readable program code embodied thereon. Such propagated data signals may take a variety of forms, including but not limited to, electromagnetic signals, optical signals, or any suitable combination of the foregoing. A computer-readable signal medium can also be any computer-readable medium, other than a computer-readable storage medium which can transmit, propagate, or transport a program for use by or in connection with an instruction execution system, apparatus, or device.

Program code embodied on a computer readable medium may be transmitted using any suitable medium, including but not limited to, wireless, wireline, optical fiber cable, RF, etc., or any suitable combination of the foregoing.

Computer program code for carrying out the operations of the examples of the present application may be written in one or more programming languages, or combinations thereof, including object-oriented programming languages, such as Java, Smalltalk, C++, and also conventional procedural programming languages such as the "C" language or similar programming languages. The program code may execute entirely on the user's computer, partly on the user's computer, as a stand-alone software package, partly on the user's computer and partly on a remote computer, or entirely on the remote computer or server. Where a remote computer is involved, the remote computer may be connected to the user's computer through any kind of network, including a local area network (LAN) or wide area network (WAN), or may be connected to an external computer (e.g., connected to the external computer using an Internet service provider over the Internet).

Note that the above embodiments are only preferred embodiments of the present application and applied technical principles. Those skilled in the art will understand that the present application is not limited to the specific embodiments described herein, and various obvious changes, readjustments and substitutions can be made by those skilled in the art without departing from the protection scope of the present application. Therefore, although the examples of the present application have been described in detail through the above embodiments, the embodiments of the present application are not limited to the above embodiments, and may also include more other equivalent embodiments without departing from the concept of the present application, and the scope of the application is determined by the scope of the appended claims.

What is claimed is:

1. A map using method, comprising:

obtaining, by a current robot, a target map including a virtual wall;

performing a move of the current robot according to the target map, wherein the target map is generated using a map construction method, and the map construction method comprises:

controlling a lidar of a mapping robot to scan a target environment to obtain scanning data, wherein a radar probe configured to determine a reference point cloud is arranged according to a preset distance by taking a center of the lidar of the mapping robot as a starting point, and the target environment comprises a wall;

determining a virtual wall corresponding to the wall according to the scanning data;

fitting the reference point cloud determined by the radar probe according to the scanning data to update the virtual wall to obtain an updated virtual wall; and generating a target map comprising the updated virtual wall.

2. The map using method according to claim 1, wherein the virtual wall comprises a defective area, the defective area is generated by blocking the wall by an obstacle in the target environment, and the fitting the reference point cloud determined by the radar probe according to the scanning data to update the virtual wall to obtain an updated virtual wall comprises:

controlling the radar probe to mark a reference point in the defective area to obtain the reference point cloud; and updating the virtual wall according to the reference point cloud.

3. The map using method according to claim 2, wherein the controlling a lidar of a mapping robot to scan a target environment to obtain scanning data comprises:

controlling the lidar of the mapping robot to scan the target environment along different control angles to obtain the scanning data at different angles;

the determining a virtual wall corresponding to the wall according to the scanning data comprises:

determining the virtual wall comprising the defective area according to the scanning data at different angles.

4. The map using method according to claim 2, wherein the controlling the radar probe to mark the reference point in the defective area to obtain the reference point cloud comprises:

overlapping an end point of the radar probe with point cloud of an edge of the virtual wall, and a scan length of the radar probe is determined; and marking, according to the scanning length, the reference point along an extension direction of the virtual wall in the defective area to obtain the reference point cloud.

5. The map using method according to claim 4, wherein the controlling a lidar of a mapping robot to scan a target environment to obtain scanning data comprises:

controlling the lidar of the mapping robot to scan the target environment along different control angles to obtain the scanning data at different angles;

the determining a virtual wall corresponding to the wall according to the scanning data comprises:

determining the virtual wall comprising the defective area according to the scanning data at different angles.

6. The map using method according to claim 1, wherein the controlling a lidar of a mapping robot to scan a target environment to obtain scanning data comprises:

controlling the lidar of the mapping robot to scan the target environment along different control angles to obtain the scanning data at different angles;

the determining a virtual wall corresponding to the wall according to the scanning data comprises:

determining the virtual wall comprising the defective area according to the scanning data at different angles.

7. The map using method according to claim 6, wherein the controlling the lidar of the mapping robot to scan the target environment along different control angles to obtain the scanning data at different angles comprises:

determining a current control angle along a reduction direction of the defective area determined by a previous control angle; and controlling the lidar of the mapping robot to scan the target environment along the current control angle to obtain scanning data of the current control angle.

8. The map using method according to claim 7, wherein the determining the virtual wall comprising the defective area according to the scanning data at different angles comprises:

taking the virtual wall comprising the defective area determined by the previous control angle as a current virtual wall; and superimposing the scanning data of the current control angle on the current virtual wall to update the defective area in the current virtual wall;

wherein a reference virtual wall corresponding to a previous control angle of a first control angle is empty.

9. A robot, comprising:
one or more processors;
a memory for storing one or more programs;
wherein when the one or more programs are executed by the one or more processors, the one or more processors realize a map using method, and the map using method comprises:
obtaining, by the robot, a target map including a virtual wall;
performing a move of the robot according to the target map, wherein the target map is generated using a map construction method, and the map construction method comprises:
controlling a lidar of a mapping robot to scan a target environment to obtain scanning data, wherein a radar probe configured to determine a reference point cloud is arranged according to a preset distance by taking a center of the lidar of the mapping robot as a starting point, and the target environment comprises a wall;
determining a virtual wall corresponding to the wall according to the scanning data;
fitting the reference point cloud determined by the radar probe according to the scanning data to update the virtual wall to obtain an updated virtual wall; and
generating a target map comprising the updated virtual wall.

10. The robot according to claim 9, wherein the virtual wall comprises a defective area, the defective area is generated by blocking the wall by an obstacle in the target environment, and the fitting the reference point cloud determined by the radar probe according to the scanning data to update the virtual wall to obtain an updated virtual wall comprises:
controlling the radar probe to mark a reference point in the defective area to obtain the reference point cloud; and
updating the virtual wall according to the reference point cloud.

11. The robot according to claim 10, wherein the controlling the radar probe to mark the reference point in the defective area to obtain the reference point cloud comprises:
overlapping an end point of the radar probe with point cloud of an edge of the virtual wall, and a scan length of the radar probe is determined; and
marking, according to the scanning length, the reference point along an extension direction of the virtual wall in the defective area to obtain the reference point cloud.

12. The robot according to claim 9, wherein the controlling a lidar of a mapping robot to scan a target environment to obtain scanning data comprises:
controlling the lidar of the mapping robot to scan the target environment along different control angles to obtain the scanning data at different angles;
the determining a virtual wall corresponding to the wall according to the scanning data comprises:
determining the virtual wall comprising the defective area according to the scanning data at different angles.

13. The robot according to claim 12, wherein the controlling the lidar of the mapping robot to scan the target environment along different control angles to obtain the scanning data at different angles comprises:
determining a current control angle along a reduction direction of the defective area determined by a previous control angle; and
controlling the lidar of the mapping robot to scan the target environment along the current control angle to obtain scanning data of the current control angle.

14. The robot according to claim 13, wherein the determining the virtual wall comprising the defective area according to the scanning data at different angles comprises:
taking the virtual wall comprising the defective area determined by the previous control angle as a current virtual wall; and
superimposing the scanning data of the current control angle on the current virtual wall to update the defective area in the current virtual wall;
wherein a reference virtual wall corresponding to a previous control angle of a first control angle is empty.

15. A non-transitory computer-readable storage medium having a computer program stored thereon, wherein when the program is executed by a processor, a map using method is realized, and the map using method comprises:
obtaining, by a robot, a target map including a virtual wall;
performing a move of the robot according to the target map, wherein the target map is generated using a map construction method, and the map construction method comprises:
controlling a lidar of a mapping robot to scan a target environment to obtain scanning data, wherein a radar probe configured to determine a reference point cloud is arranged according to a preset distance by taking a center of the lidar of the mapping robot as a starting point, and the target environment comprises a wall;
determining a virtual wall corresponding to the wall according to the scanning data;
fitting the reference point cloud determined by the radar probe according to the scanning data to update the virtual wall to obtain an updated virtual wall; and
generating a target map comprising the updated virtual wall.

16. The non-transitory computer-readable storage medium according to claim 15, wherein the virtual wall comprises a defective area, the defective area is generated by blocking the wall by an obstacle in the target environment, and the fitting the reference point cloud determined by the radar probe according to the scanning data to update the virtual wall to obtain an updated virtual wall comprises:
controlling the radar probe to mark a reference point in the defective area to obtain the reference point cloud; and
updating the virtual wall according to the reference point cloud.

17. The non-transitory computer-readable storage medium according to claim 16, wherein the controlling the radar probe to mark the reference point in the defective area to obtain the reference point cloud comprises:
overlapping an end point of the radar probe with point cloud of an edge of the virtual wall, and a scan length of the radar probe is determined; and
marking, according to the scanning length, the reference point along an extension direction of the virtual wall in the defective area to obtain the reference point cloud.

18. The non-transitory computer-readable storage medium according to claim 15, wherein the controlling a lidar of a mapping robot to scan a target environment to obtain scanning data comprises:
controlling the lidar of the mapping robot to scan the target environment along different control angles to obtain the scanning data at different angles;
the determining a virtual wall corresponding to the wall according to the scanning data comprises:
determining the virtual wall comprising the defective area according to the scanning data at different angles.

19. The non-transitory computer-readable storage medium according to claim 18, wherein the controlling the lidar of the mapping robot to scan the target environment along different control angles to obtain the scanning data at different angles comprises:

determining a current control angle along a reduction direction of the defective area determined by a previous control angle; and controlling the lidar of the mapping robot to scan the target environment along the current control angle to obtain scanning data of the current control angle.

20. The non-transitory computer-readable storage medium according to claim 19, wherein the determining the virtual wall comprising the defective area according to the scanning data at different angles comprises:

taking the virtual wall comprising the defective area determined by the previous control angle as a current virtual wall; and superimposing the scanning data of the current control angle on the current virtual wall to update the defective area in the current virtual wall;

wherein a reference virtual wall corresponding to a previous control angle of a first control angle is empty.

* * * * *